United States Patent [19]

Barrows

[11] Patent Number: 5,640,796
[45] Date of Patent: Jun. 24, 1997

[54] ACTIVE HOOK FISHING LURE

[76] Inventor: Armando Antonio Barrows, 707 Grenada La., Little Torch Key, Fla. 33042

[21] Appl. No.: 539,553

[22] Filed: Oct. 5, 1995

[51] Int. Cl.$^6$ .................................................. A01K 83/00
[52] U.S. Cl. ........................................ 43/37; 43/35; 43/36
[58] Field of Search ............................ 43/34, 35, 36, 43/37, 42.06, 42.28

[56] References Cited

U.S. PATENT DOCUMENTS

| | | | |
|---|---|---|---|
| 321,796 | 7/1885 | Clark | 43/36 |
| 377,294 | 1/1888 | Dietz | 43/36 |
| 463,519 | 11/1891 | Lagerstedt | 43/35 |
| 1,259,390 | 3/1918 | Gilbert | 43/36 |
| 1,464,215 | 8/1923 | Olson . | |
| 1,556,297 | 10/1925 | Moore | 43/37 |
| 1,609,151 | 11/1926 | Bruenig . | |
| 1,670,174 | 5/1928 | Wiersma | 43/35 |
| 1,812,906 | 7/1931 | Swearingen | 43/37 |
| 2,261,068 | 10/1941 | Mackovich . | |
| 2,439,391 | 4/1948 | Jobson | 43/37 |
| 2,896,355 | 7/1959 | Dean et al. . | |
| 2,968,113 | 1/1961 | Multanen . | |
| 3,218,749 | 11/1965 | Dow . | |
| 3,410,019 | 11/1968 | Landi | 43/37 |
| 3,646,699 | 3/1972 | Zeman . | |
| 3,786,587 | 1/1974 | Niileksela . | |
| 3,816,953 | 6/1974 | Hameen-Anttila . | |
| 3,986,289 | 10/1976 | Zimmerman | 43/37 |
| 4,024,668 | 5/1977 | McDiarmid et al. . | |
| 4,274,220 | 6/1981 | Rogers, Jr. . | |
| 4,525,948 | 7/1985 | Huntington . | |
| 5,010,679 | 4/1991 | Tischer . | |
| 5,161,323 | 11/1992 | Braden | 43/37 |
| 5,170,580 | 12/1992 | Rosenblatt . | |
| 5,276,993 | 1/1994 | Rosenblatt . | |

*Primary Examiner*—Kurt Rowan
*Attorney, Agent, or Firm*—Jacobson, Price, Holman & Stern, PLLC

[57] ABSTRACT

A fishing lure including a lure body (1) having an internal bore (12) therein, a plurality of slots (6) extending radially in said lure body between the outer surface thereof and said bore, a plurality of fish hooks (3) having inner forward ends 20 pivotally connected to a ring member (2) within the bore for free movement therein and outer rear hook ends (22) with a curved shank portion (18) between the ends, and a driver plug (5) freely movable within the bore and having slots (14) therein with tapered cam surfaces (16) engaging the curved back sides of the hooks for urging the hooks radially outwardly of the lure body by forward movement of the driver plug in the bore with respect to the lure body (1). A resilient restraining element (7) engages the outer curved surfaces of the shanks of the hook members to resiliently retain the hook members in the fully retracted position. The strike of a fish on the lure body causes the driver plug to move forwardly within the bore (12) toward the forward end of the lure body when the lure is dragged through the water by a fishing line (8) attached to a connector (4) on the driver plug (5) to expand the fishing hooks radially outwardly by the camming action of the cam surface (16) against the restraining force of the elastic restraining member (7). When the forward ends (20) of the hooks reach the forward end of the bore (12) the driver plug (5) has expanded the hooks to their outermost position where they are most effective to engage and hook a fish striking the lure. A separate fish attracting member (28) having a forward end (30) engageable in a peripheral groove (9) in the head end of the lure body may be used to increase the effectiveness of the lure. The fish attracting member (28) is made of a foamed hydrophilic resin saturated with liquid fish attractant which renders the member elastic and flexible by virtue of the special material from which the fish attractant member is made.

11 Claims, 2 Drawing Sheets

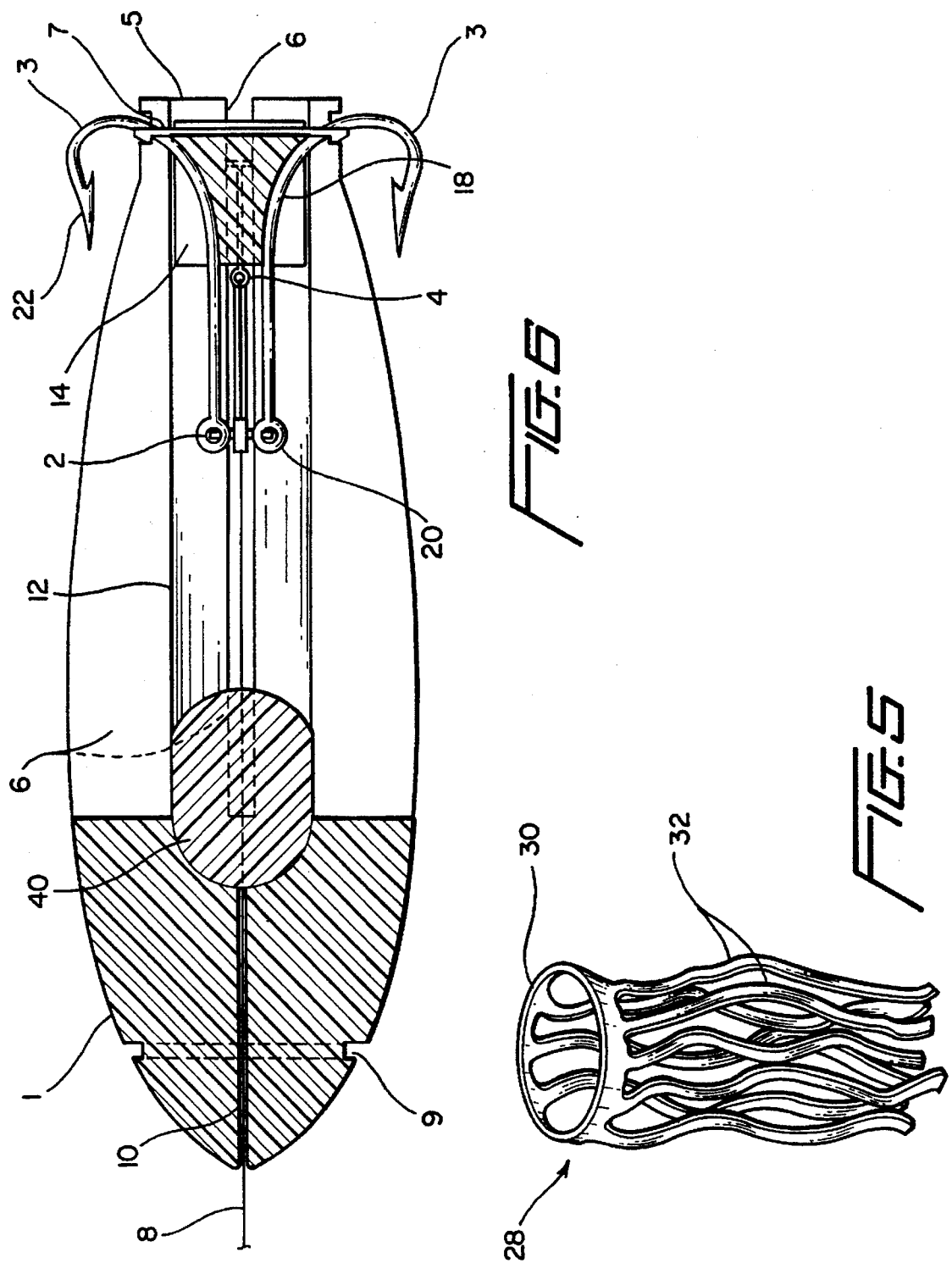

ACTIVE HOOK FISHING LURE

BACKGROUND OF THE INVENTION

This invention relates to a fishing lure of the type wherein fish hooks are movably mounted within a lure body, having a shape and size for attracting fish, so that when the lure body is attacked by a fish, such as by biting it, the hooks are automatically moved from an at least partly concealed position to a protruding position for effectively hooking the fish.

Literature in the field related to design of fishing lures is replete with variations in size, color, materials of construction, hydrodynamic characteristics affecting the lure movements as it passes through the water, and similar variations intended to permit the lure to create an attraction illusion to the fish intended as target species being pursued. In all these cases, the concept is that of approximating behavior and appearance of prey on which the specie normally feeds.

In the prior art, most lures are normally equipped with one or more hooks disposed near the rear of the lure on the assumption that a fish overtaking the lure from the rear will swallow or "strike" it from that position, and inadvertently also swallow the hook(s) at the same time. In all these configurations, the hook or hooks are fixed components of the lure and/or passively dangling appendages.

Unfortunately, having attracted the fish to bite or swallow the lure, many such "strikes" do not result in a "hook-up", i.e. having bitten at the lure rather than swallowing it, the fish is neither securely hooked nor hooked at all. Many fish attack from a variety of directions when they see what they believe to be something to eat. They may be below, above, on either side, or behind the prey when they make their attack. In many cases, as a matter of random direction of the strike, they may bite at the lure and not engage a hook in the process. The "envelope of approach" is spherical rather than a conical shape emerging from the tail. The hook is simply hanging passively attached to the lure in a position believed to be in the line with what is assumed the most probable direction of attack.

Fishermen have control of their tackle, its mechanical condition, its efficiency of operation, strength of the line, and all components of their gear to assure its capability of handling the fish once hooked. Ability to retain a hooked fish on the line during the process of landing it is somewhat related to the skill of the fisherman in addition to adequacy of his equipment. However, ability to land a fish not securely hooked at the outset is marginal at best. While probability of success under such circumstances is highly dependent on the skill and experience of the fisherman, it may be substantially improved by means to produce a greater assurance of a well set hook as soon as the strike occurs.

The concept of improving the probability of securing a lure hook in the fish, by improving the likelihood of hook engagement once the lure has been struck, has also attracted prior art development. Dean et al., U.S. Pat. No. 2,896,355; Zeman, U.S. Pat. No. 3,646,699; Nileksela, U.S. Pat. No. 3,786,587; Hameen-Antilla, U.S. Pat. No. 3,816,953; and McDiarmid, U.S. Pat. No. 4,024,668, show efforts to mechanically drive the hook into engagement in the mouth of the fish by stored energy means contained within the lure. These have used the energy stored in a spring to drive the hooks outward into the mouth of the fish from a hook or hook assembly stored within the lure body, either triggered by the fish strike or externally triggered by the angler manipulating the line. In some jurisdictions, use of such mechanically driven hooks have been declared illegal.

Active fishing lure hook mechanisms that do not depend upon stored energy activation are shown in U.S. Pat. No. 1,464,215 to Olson; U.S. Pat. No. 1,609,151 to Bruenig; U.S. Pat. No. 2,968,113 to Multanen; U.S. Pat. No. 3,218,749 to Dow; U.S. Pat. No. 4,274,220 to Rogers; U.S. Pat. No. 4,525,948 to Huntington; and U.S. Pat. No. 5,010,679 to Tischer.

In an effort to develop an active hook mechanism that does not depend upon stored energy activation, Rogers (U.S. Pat. No. 4,274,220) devised a lure containing an assembly of hooks within the lure body and pivotally attached therein to permit them to be cammed radially outward through slots in the lure body provided for the purpose, by a sliding ball within the lure body attached to the line which slides forward when the lure is struck. Unfortunately, the arrangement leaves the entire lure assembly, body and contents, fixed together after the strike has occurred, leaving the fish opportunity to dislodge the lure if it has not been totally swallowed or engorged in the process of becoming engaged in the mouth of the fish during the strike. Several fish species characteristically attempt to dislodge lures and hooks by scraping them on the bottom or against rocks in the habitat (viz.—groupers, permit, etc.).

BRIEF SUMMARY OF THE INVENTION

The present invention improves the action of the lure in response to attack by a striking fish. A plurality of hooks are disposed radially about the center of a hollow interior of the lure body and mounted in such a way that when the lure is struck by a fish, approaching from any direction when the strike occurs anywhere along the length of the body of the lure, the striking action drives the hooks, causing them to extend or protrude radially outward from the body of the lure where they become positioned to engage the fish regardless of the direction from which the lure is struck. The mechanism activating the hook extension action is driven by means of the energy in the strike itself, and is not dependent on any stored energy source contained within the device. Unlike any prior art, once the present lure has been seized and the hooks extended to engage the mouth of the fish, the only portion engaged becomes the hook assembly and its driving cam attached to the line. The body of the lure is free to slide upward along the line (if it has not also become completely engorged in the mouth of the fish), and is no longer involved in any action that follows the initial strike. Rubbing or scraping it on rocks or the bottom to dislodge it has no effect on the hook portions in the mouth of the fish. The lure body simply slides up along the line. The mouth of the fish is not left agape with part of the lure body protruding if not completely swallowed during the initial strike. Any effort by the fish to disgorge the lure will simply eject the lure body, leaving the hook assembly and driver within the mouth of the fish.

The only form of strike which might not effect the desired camming action to thrust the hooks outward would be one that, of itself, moves the lure body freely forward along the line. However, any lateral thrashing motion of the fish thereafter would immediately redirect body shell movement, and any instinctive snatch on the line imparted by the angler to set the hook, once a nibble or strike is felt, would achieve the same effect. It becomes highly improbable that a fish would approach directly from the rear, lightly swallow a portion of the lure (sliding the body forward), and open his mouth to release the lure without having made a slight lateral movement in the process, and without the angler feeling enough on the line to react with a hook-setting snatch.

The body of the lure is made of any material which may be shaped to produce the desired floating or sinking lure motion behavior when drawn through the water. It may be a hollow body of hydrodynamic shape to facilitate its passage through the water with minimum drag effect, in selected sizes to approximate the size of the typical prey of the fish species being sought, colored and/or have attachments that further simulate appearance of the prey being simulated, and contain within the hollow body a series of hooks disposed radially around a central driver mechanism operating within the body of the lure casing. The driver mechanism is sized to permit it to slide forward in the lure body in the manner of a piston in a cylinder. The leader and line are attached to the end of the driver. The hooks, attached to a sliding ring assembly within the body of the lure through eyes at the shank ends of the hooks, are free to rotate radially outward about their pinned attachment points by provision of longitudinal slots in the cylindrical body of the lure through which the hook points protrude and along which they are free to slide translationally while rotating radially outward about the sliding ring assembly during that longitudinal transit. A tapered conical cam surface, or a plurality of such surfaces, is (are) affixed to (or an integral part of) the driver for engaging contact with the curved back faces of the hooks. As the driver moves forward through the lure body, the sliding cam surface, or surfaces, forces each hook radially outwardly through the longitudinal slots in the lure body as they execute their rotational motion with respect to their pinned shank ends, after which the end of the driver, engaged in or with the ring to which the hooks have been assembled, carries the entire assembly longitudinally up the inner surface of the body of the lure until it comes to bear on the head end of the interior cylindrical body shell of the lure, having driven the hooks radially outward.

In operation, when the lure is pulled or trolled through the water, the pull on the line and leader is equal to the drag of the lure through the water. The hooks, attached by means of their ring assembly, are restrained from movement within the shell by means of an elastic restraining band around the perimeter of their passage across the tapered cam face of the driver. While a variety of elastic tensioning materials may be selected, a rubber band will serve purposes of facilitating description of the operation.

The line (or leader) is fed through the end of the lure body, thence through the hook assembly ring, and is attached to the driver. The bottom of the driver supports the rubber band in a perimeter groove around its base. Pulling the body against the pull of the line forces the driver to move forward in the lure body, forcing the hook(s) to slide along the cam surface(s) of the driver, stretching the rubber band, and displacing the hook(s) radially outward by the force exerted along the cam surface(s).

In the initial pre-strike stage, the driver base is near the extreme rear end of the lure assembly, and the hooks are in their fully retracted position in the body of the lure. In that condition, the hooks are only marginally visible, and allow smoother trolling movement with reduced opportunity for snagging seaweed (or the bottom if trolled deeply), further maximizing utility of the lure in attracting fish.

Anything seizing the body of the lure from any direction causes the lure body shell to move in the direction of increased drag. The lure body moves toward the rear of the assembly relative to the position of the driver which remains attached to the line within the lure. As the lure body moves relatively toward the rear, the tapered cam surfaces on the driver are drawn relatively toward the front end of the lure causing the hooks to rotate radially outward about their ring assembly through the longitudinal slots, and causing the rubber band to stretch as the hooks extend themselves outward from the external body of the lure where they are more likely to intercept a portion of the mouth of the attacking fish regardless of the direction from which the attack occurred.

If the fish strikes the lure directly from the rear, it might swallow all or the rear portion of the lure. As soon as the body of the lure is seized, the line and driver continue to move forward while the outer shell of the seized lure slides toward the rear, causing the driver to cam the hooks outward, stretching the rubber band. As that movement continues, the cam along the back of the hooks slides forward forcing the hooks to extend outward through the longitudinal slots in the lure body any portion or all of which is already within the fish's mouth.

Should the lure be struck from the side, the pull on the line will still cause the driver to slide forward within the body of the lure (or the body to slide toward the rear), again extending the hooks outward from the lure sides by the same cam action, hooking the sides of the fish's mouth as the line pull draws the lure through the fish's mouth. Similarly, any sudden pull on the line by the angler, in response to the strike, or even in response to feeling a "nibble", also pulls the driver within the shell forward, causing the hooks to cam outward, and increasing likelihood of engaging the mouth of the fish that has seized the lure body. That action occurs regardless of the direction from which the lure is struck. Anything attempting to seize and hold the body of the lure causes the driver to move forward within the lure body and drive the hooks outward.

Once the hook(s) have been set, it no longer matters whether or not the body of the lure or any portion thereof is retained within the mouth of the fish. While the lure body remains free to slide back up the line, the hooks attached to the line via the driver, remain engaged in the fish.

BRIEF DESCRIPTION OF THE DRAWINGS

The invention will now be described in detail with reference to the accompanying drawings wherein:

FIG. 5 is a perspective view of a fish attracting member attachable to the main body of the lure; and FIG. 6 is a view similar to FIG. 1 showing a further embodiment of the invention.

DETAILED DESCRIPTION

Figure 1:
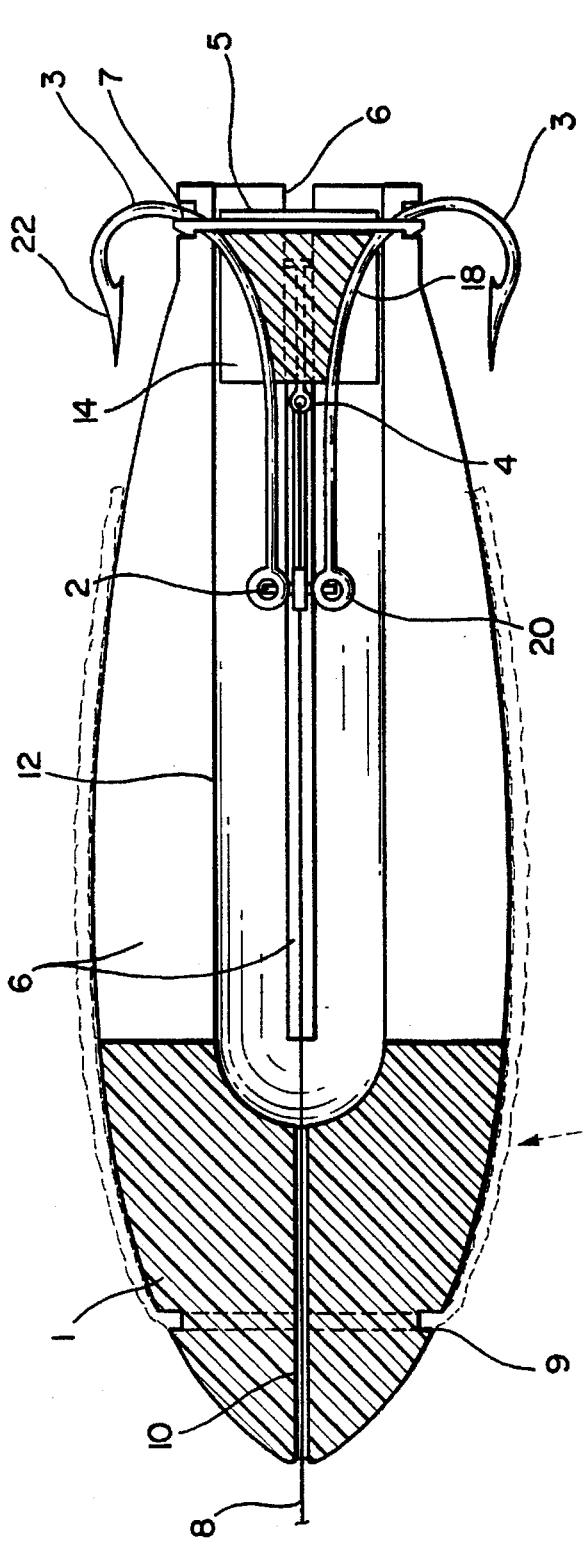
FIG. 1 is a longitudinal cross-sectional view through an embodiment of the fishing lure of this invention.
Figure 4:
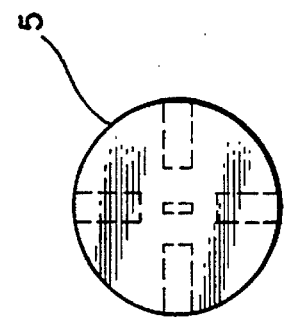
FIG. 4 is a rear elevational view of the driver of FIG. 2.
Figure 3:
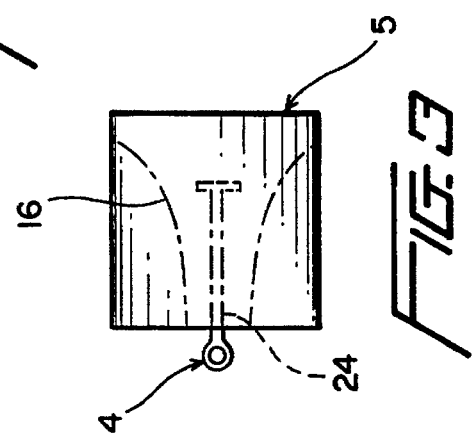
FIG. 3 is a side elevational view of the driver of FIG. 2.
Figure 2:
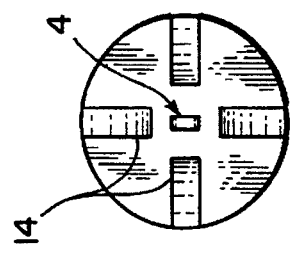
FIG. 2 is a front elevational view of the driver shown in FIG. 1.

FIG. 1 is a longitudinal cross section of an embodiment of the invention illustrating the internal construction and mechanism of the lure. The line or leader 8 is threaded through a hole 10 in the forward part or the head of the lure body shell 1 through the center of hook assembly ring 2, around which the forward end of a plurality of hooks 3 have been arranged, and thence attached to eye 4 provided therefor in the forward end of driver plug 5 which is positioned at the rear end of the lure. Eye 4 is on the forward end of a pin embedded in driver plug 5. The main body 1 may be made of any suitable material including wood, plastic or rubber, for example, to facilitate molding or fabrication thereof and may be hydrodynamically shaped, such as streamlined. Driver plug 5 can be made from the same materials as lure body 1, or metal, for example. Driver plug 5 is free to move forward in the central bore 12 in the lure shell 1 should anything hold the lure body while the line is being pulled forwardly. The radial slots 14 in driver plug 5 have interior conical tapered surfaces 16 which form cam surfaces engaging against the back of each hook curvature 18 where the hook shanks bend around to become the hooks. The forward end of the hooks are arranged pivotally around the perimeter of their attaching ring 2 with which the hook, eyes 20 are engaged and extend through radial longitudinal slots 6 in the shell body of the lure with just the tips of the hook ends 22 located at the rearward end of the hooks projecting therethrough in response to the normal drag forces operating along the exterior surface of the lure during normal trolling movement. These slots 6 serve as a guide directing the movement of the hooks radially outward should driver plug 5 move forward relative to lure body shell 1. As the lure moves through the water, the hydrodynamic drag of the water along the exterior surface of lure body 1 is equal to the line tension of the fishing line 8 attached to eye 4 in driver 5. The elastic retainer 7 engaging the insides of the curvature 18 at each hook elastically restrains the hooks in their retracted position and maintains the hooks in a position causing the curvature of the backs of the hooks to bear against the cam surfaces 16 of the driver slots. In the trolling mode, the hooks remain in the fully retracted position.

In the use of the invention, should anything seize any part of body shell 1 of the lure, the effective drag applied to the shell body increases and the shell body moves relatively downward or rearwardly along internally connected fishing line 8 toward the driver 5. That relative movement causes the driver to push the curved backs of hooks 3 along the cam surfaces 16 of driver 5 overcoming the force of elastic retainer 7 by stretching it. As driver 5 moves relatively forward in bore 12 in shell 1, that cam action forces the hooks to rotate radially outwardly on hook assembly ring 2 whereby the hooks move radially outwardly through their guide slots 6, thereby exposing more hook area to engage whatever has seized exterior body 1 of the lure. The maximum travel of driver.5 forward within shell body 1 is limited by the distance it can move before the hook ring assembly 2 and hook eyes 20 bear against the inside 26 of the interior of the head end of the lure at the inner end of bore 12. At that point the maximum intended erect position of hooks 3 outward from the body or axis of the lure has been achieved.

As a further enhancement of the basic design of the lure, to improve its ability to attract fish to bite, a perimeter groove 9 may be formed in lure body shell 1 just to the rear of the tip of its head or forward end to facilitate attaching a fish attracting member 28 thereto. The member 28 generally includes a collar 30 with integrally molded streamers 32 disposed around its perimeter, made of a hydrophilic foamed resin, in accordance with that described in Rosenblatt U.S. Pat. No. 5,170,580, and may be installed on the lure body after the material of which it is made has been rendered elastic by saturation with a liquid fish attractant. In its fluid-absorbed condition, both the collar 30 and its integrally molded trailing tendrils 32 are fully elastic and flexible, so that it may be slightly stretched to slip over the head of the lure and be seated in groove 9. This hydrophilic material can be made in any of a variety of colors that may be found most attractive to the variety of fish being targeted. The fish attractant with which it has become distended remains effective for a protracted period of time due to the extremely slow rate at which it is released from the foamed material of which it employed in the prior art as fishing lures itself (Rosenblatt U.S. Pat. No. 5,276,993) including its impregnation with a variety of liquid fish attractants available on the market. U.S. Pat. Nos. 5,170,580 and 5,276,993 are incorporated herein by reference.

Equipped with this additional member 28, the lure is rendered both chemically and visually more fish-attracting, in addition to having the advantageous characteristics that increase probability of setting its hooks after it has been initially struck by a fish.

In another embodiment, by installing a quantity of the hydrophilic material in the form of a spongelike mass 40 within the lure body forward of the sliding driver and hook ring 2 assembly, the angler is enabled to periodically discharge a quantity of fish attractant from time to time during trolling, by snatching the line enough to cause the driver and hook ring assembly to squeeze the spongelike mass of foamed hydrophilic resin containing the fish attractant against the forward end of bore 12.

In a further embodiment of the invention, a body of compressible hydrophilic foamed resin 40, render elastic and flexible by saturation with a liquid fish attractant, is disposed in the forward end of the bore 12 so that when the hooks are driven forward by the driving plug 5 drawn by fishing line 8 the forward ends 20 and ring 2 can be impacted against the foamed resin body forward by jerking of the fishing line by the user to thereby selectively force discrete quantities of fish attractant from the foamed resin body to further assist in attracting a fish (see FIG. 6).

In a still further embodiment of the invention an elastic stocking of fish attracting hydrophilic foamed resin saturated with a liquid fish attractant engages snugly around the lure body, and is provided with slots therein aligned with slots 6 in the lure body to preclude obstruction of radial expanding movement of the hooks during use.

Additionally, from test use of a prototype, it was observed that a fish is rarely hooked by only one of the hooks assembled in the lure. Several hooks are simultaneously engaged. With that plurality of hooks engaged, need for the hooks to be barbed to assure retention of the engagement is reduced, and use of barbless hooks remains effective in retaining the fish. That greatly reduces damage to the fish's mouth when extracting the lure from the fish after it has been landed, and greatly facilitates accomplishing the extraction by the angler.

I claim:

1. A fishing lure comprising:

a lure body having an exterior configuration shaped to attract fish and having a forward head end and a rear end, a hollow bore in said body extending between said rear end and said head end and having a rear end open through said rear end of said body and a forward end in said head end;

a fishing line hole extending through said head end and having a forward end open through the forward end of said head end and a rear end open to said forward end of said bore;

a plurality of slots in said body extending between said bore and the outer surface of said body and between said head end and said rear end of said body;

a plurality of fish hooks having a curved shank portion a forward end having a connecting eye and a rear end having a hook portion with a point thereon directed forwardly, each fish hook being disposed in a respective slot in said body for sliding guiding movement therethrough;

a ring member freely movable in said bore and extending through said connecting eyes of said fish hooks to facilitate pivotal movement of said fish hooks around said ring member;

a driver plug slidable in said bore between said rear end and forward end thereof and being disposed between said rear end of said bore and said ring member;

a tapered conical cam surface means on said driver plug engageable in sliding contact with curved surfaces on said hooks for displacing said hooks radially outwardly and pivotally about said ring member when said driver plug is moved toward said forward end of said bore;

a fishing line extending through said fishing line hole in said head and having a lure end connected to said driver plug;

resilient retaining means engaging said hooks for resiliently retaining said hooks in a retracted position radially inwardly near said rear end of said body; and said resilient retaining means having an elastic tension force substantially equal to hydrodynamic drag on said lure body as said lure is dragged through water by said fishing line, so that said hooks are retracted by said retaining means in said retracted position when said lure is dragged through the water by said fishing line and when said lure body is attacked by a fish thereby increasing said hydrodynamic drag by restraining forward motion of said lure body said driver plug is displaced forwardly in said bore by said fishing line and said hooks are cammed radially outwardly by said tapered cam surface means on said driver plug against the restraining force of said retaining means as said driver plug moves forwardly in said bore until said driver plug engages said ring member adjacent said forward end of said bore where said hooks are in a maximum radially outward exposed position for engagement with the fish, said lure body being free to move along said fishing line with respect to said hooks and driver plug.

2. The fishing lure as claimed in claim 1 wherein:

said cam surface means on said driver plug comprises a plurality of radially extending slots in said driver plug, each slot engaging one of said hooks, and a tapered cam surface at the bottom of each of said slots engageable with a curved surface on a back side of a respective hook.

3. The fishing lure as claimed in claim 1 wherein:

said lure body is made of a material having a buoyancy to facilitate floating of said lure on water in use.

4. The fishing lure as claimed in claim 1 wherein:

said lure body is made of a material to produce a sufficient weight to facilitate casting of said lure and sinking below the surface of water in use.

5. The fishing lure as claimed in claim 1 and further comprising:

a groove on said lure body about the exterior surface thereof; and fish attracting means located in said groove without impeding active outward movement of said hooks when said lure is attacked by a fish striking it from any direction.

6. The fishing lure as claimed in claim 1 wherein:

said slots in said lure body comprise four slots circumferentially spaced at 90° intervals;

said hooks comprise four hooks, one hook being engaged in one of said slots; and said camming means on said driver plug comprises four slots, each slot in said driver plug having a tapered camming surface at the bottom thereof engageable with said backsides of a respective hook curvature, said slots in said driver plug being aligned with said slots in said lure body so that each of said hooks extend through a slot in said driver plug and a slot in said lure body in use.

7. The fishing lure as claimed in claim 1 and further comprising:

a molded resin collar member attached to said forward head end of said lure body comprising hydrophilic foamed resin saturated with a liquid fish attractant and being elastic and flexible.

8. The fishing lure as claimed in claim 7 and further comprising:

a peripheral groove around said head end of said lure body for attaching said collar member to said lure body.

9. The fishing lure as claimed in claim 8 wherein:

said collar member comprises a substantially circular collar engageable in said peripheral slot and a plurality of circumferentially spaced streamers extending from said collar rearwardly therefrom in use.

10. The fishing lure as claimed in claim 8 wherein:

said fish attracting member comprises an elastic stocking engaging snugly around said lure body and having a forward collar member engageable in said peripheral groove in said head member and provided with slots therein aligned with said slots in said lure body to preclude obstruction of said radial extension of said hooks in use.

11. The fishing lure as claimed in claim 1 and further comprising:

a body of compressible hydrophilic foamed resin, rendered elastic and flexible by saturation with a liquid fish attractant, in said forward end of said bore in said lure body between said head end and said hook ring member for engagement by said hook ring member and said forward ends of said hooks when said hooks and said ring member are displaced forwardly in said bore by said driver plug and said lead line, so that jerking of said line by said user impacts said forward ends of said hooks and ring member with said saturated body of foamed resin forcing discreet quantities of fish attractant therefrom to be ejected as desired by the user.

* * * * *